(12) United States Patent
Torudbakken et al.

(10) Patent No.: US 7,356,636 B2
(45) Date of Patent: Apr. 8, 2008

(54) VIRTUALIZED PCI SWITCH

(75) Inventors: Ola Torudbakken, Oslo (NO); Bjørn Dag Johnsen, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 285 days.

(21) Appl. No.: 11/112,023

(22) Filed: Apr. 22, 2005

(65) Prior Publication Data

US 2006/0242353 A1 Oct. 26, 2006

(51) Int. Cl.
*G06F 13/00* (2006.01)
(52) U.S. Cl. ..................... 710/313; 710/316
(58) Field of Classification Search .......... 710/306, 710/313, 316
See application file for complete search history.

(56) References Cited

U.S. PATENT DOCUMENTS

| | | | |
|---|---|---|---|
| 6,496,880 B1* | 12/2002 | Ma et al. ................. | 710/38 |
| 2004/0268015 A1 | 12/2004 | Pettey et al. | |
| 2005/0025119 A1 | 2/2005 | Pettey | |
| 2005/0038947 A1* | 2/2005 | Lueck et al. ............. | 710/315 |
| 2005/0053060 A1 | 3/2005 | Pettey | |
| 2005/0102437 A1 | 5/2005 | Pettey | |
| 2005/0125590 A1* | 6/2005 | Li et al. .................. | 710/317 |
| 2005/0246460 A1* | 11/2005 | Stufflebeam, Jr. ........ | 710/104 |
| 2005/0270988 A1* | 12/2005 | DeHaemer ............... | 370/254 |
| 2006/0018342 A1* | 1/2006 | Pettey et al. ............. | 370/465 |
| 2006/0123137 A1* | 6/2006 | DeHaemer et al. ....... | 710/2 |
| 2006/0195848 A1* | 8/2006 | Arndt et al. ............. | 718/104 |

OTHER PUBLICATIONS

Ravi Budruk, Don Anderson, Tom Shanley: "PCI Express System Architecture", 2004, pp. 729-730, Mindshare, XP002398437, ISBN: 0-321-15630-7.
PCT International Search Report for International Application No. PCT/US2006/013291, 3 pages, 2006.
Written Opinion of the International Search Authority for International Application No. PCT/US2006/013291, 5 pages, 2006.

* cited by examiner

*Primary Examiner*—Glenn A. Auve
(74) *Attorney, Agent, or Firm*—Park, Vaughan & Flemming LLP (57) ABSTRACT

A PCI-Express interconnect device is provided. The device comprises: first and second upstream ports; first and second downstream ports; and a management entity. The management entity is operable to logically partition the device such that the first upstream port is operable to communicate with the first downstream port and the second upstream port is operable to communicate with the second downstream port. In one example, the management device is additionally operable to migrate the first downstream port from a partition in which the first downstream port is operable to communicate with the first upstream port into a partition in which the first downstream port is operable to communicate with the second upstream port.

16 Claims, 10 Drawing Sheets

| 31 | | | 0 | Byte Offset (Hex) |
|---|---|---|---|---|
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Register 0 | | | | 10 |
| Base Address Register 1 | | | | 14 |
| Secondary Latency Timer | Subordinate Bus Number | Secondary Bus Number | Primary Bus Number | 18 |
| Secondary Status | | I/O Limit | I/O Base | 1C |
| Memory Limit | | Memory Base | | 20 |
| Prefetchable Memory Limit | | Prefetchable Memory Base | | 24 |
| Prefetchable Base Upper 32 Bits | | | | 28 |
| Prefetchable Base Lower 32 Bits | | | | 2C |
| I/O Limit Upper 16 bits | | I/O Limit Lower 16 bits | | 30 |
| Reserved | | | Capabilities Pointer | 34 |
| Expansion ROM Base Address | | | | 38 |
| Bridge Control | | Interrupt Pin | Interrupt Line | 3C |

FIGURE 6

| | | Byte Offset (Hex) |
|---|---|---|
| Device ID | Vendor ID | 00 |
| Status | Command | 04 |
| Class Code | Revision ID | 08 |
| BIST \| Header Type \| Master Latency Timer \| Cache Line Size | | 0C |
| Base Address Registers | | 10 |
| | | 14 |
| | | 18 |
| | | 1C |
| | | 20 |
| | | 24 |
| Cardbus CIS POinter | | 28 |
| Subsystem ID | Subsystem Vendor ID | 2C |
| Expansion ROM Base Address | | 30 |
| Reserved | Capabilities Pointer | 34 |
| Reserved | | 38 |
| Max_Lat \| Min_Gnt \| Interrupt Pin \| Interrupt Line | | 3C |

(bit 31 — bit 0)

VIRTUALIZED PCI SWITCH

FIELD

The present invention relates to a virtualized PCI device and in particular, but not exclusively, to a virtualized PCI-Express switch with port migration capabilities.

BACKGROUND

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU <->I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Slots and a Root Complex.

SUMMARY OF THE INVENTION

The present invention has been made, at least in part, in consideration of problems and drawbacks of conventional systems.

Viewed from a first aspect, there is provided an interconnect device for PCI Express. The interconnect device can comprise a plurality of ports, each configurable as either an upstream port or a downstream port, wherein two ports are configured as first and second upstream ports, and two ports are configured as first and second downstream ports. The interconnect device can also comprise a management entity operable to logically partition the device such that the first upstream port is operable to communicate with the first downstream port and the second upstream port is operable to communicate with the second downstream port. Thus a single physical interconnect device such as a switch can be partitioned into a number of virtual switches, each providing connections between a root complex and one or more endpoint devices.

Viewed from a second aspect, there is provided an interconnect device for PCI Express. The interconnect device can comprise: first and second upstream ports, at least one downstream port, and a management entity operable to direct a disconnection request to said first upstream port in respect of a downstream port. The management entity can be further operable to direct a connection request to said second upstream port in respect of said downstream port. In some examples, each of the ports is configurable as either an upstream port or a downstream port. Thus a single physical interconnect device can be partitioned into a number of virtual switches, each providing connections between a root complex and one or more endpoint devices. By mapping virtual ports defined in each partition onto the physical ports of the interconnect device, an endpoint device connected to one of the ports can be migrated between partitions and hence between root complexes.

Viewed from another aspect, there is provided a switch for PCI Express. The switch can comprise: a first port operable to be connected to a first root complex; a second port operable to be connected to a second root complex; a third port operable to be connected to an I/O device and having a data connectivity path to the first port; and a migration controller operable to cause said data connectivity path to be closed and to cause a further data connectivity path to be established between said third port and said second port. Thus a single physical switch can provide access to a single endpoint for each of a number of hosts by remapping a port to which the endpoint is connected from a partition which provides connectivity to a first host to a partition which provides connectivity to a second host.

Viewed from another aspect, there is provided a connectivity fabric. The fabric can comprise: a first root complex, a second root complex, an endpoint and a switch. The switch can have: a first port operable to be connected to the first root complex, a second port operable to be connected to the second root complex, a third port operable to be connected to the endpoint and having a data connectivity path to the first port, and a migration controller operable to cause said data connectivity path to be closed and to cause a further data connectivity path to be established between said third port and said second port. Thus a single physical switch can provide access to a single endpoint for each of a number of hosts in a fabric by remapping a port to which the endpoint is connected from a partition which provides connectivity to a first host to a partition which provides connectivity to a second host. Thus the fabric can be altered to accommodate a given endpoint in a number of different hierarchies depending upon a variety of utilization and provisioning requirements.

Viewed from a further aspect, there is provided a method of migrating an I/O device between two hosts. The method can comprise: causing a connection between a first host and an I/O device to be terminated; and causing a connection between the I/O device and a second host to be initiated. Thus a plurality of hosts can be provided with access to a single endpoint on a non-concurrent basis by remapping a data connectivity path from the I/O device between the hosts.

Particular and preferred aspects and embodiments of the invention are set out in the appended independent and dependent claims.

BRIEF DESCRIPTION OF THE FIGURES

Specific embodiments of the present invention will now be described by way of example only, with reference to the accompanying figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

One computer interconnect standard is the PCI-Express 1.0 standard set out in the PCI-Express Base Specification 1.0 available from the PCI (Peripheral Component Interconnect) Special Interest Group (www.pcisig.com). The PCI-Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI-Express by a highly scalable, fully serial interface. Among the advanced features supported by PCI-Express are Power Management, Quality Of Service (QoS), Hot-Plug/Hot-Swap support, Data Integrity, and Error Handling. PCI-Express is also backwards compatible with the software models used to describe PCI, such that PCI-Express hardware can be detected and configured using PCI system configuration software implementations with no modifications.

Figure 1:
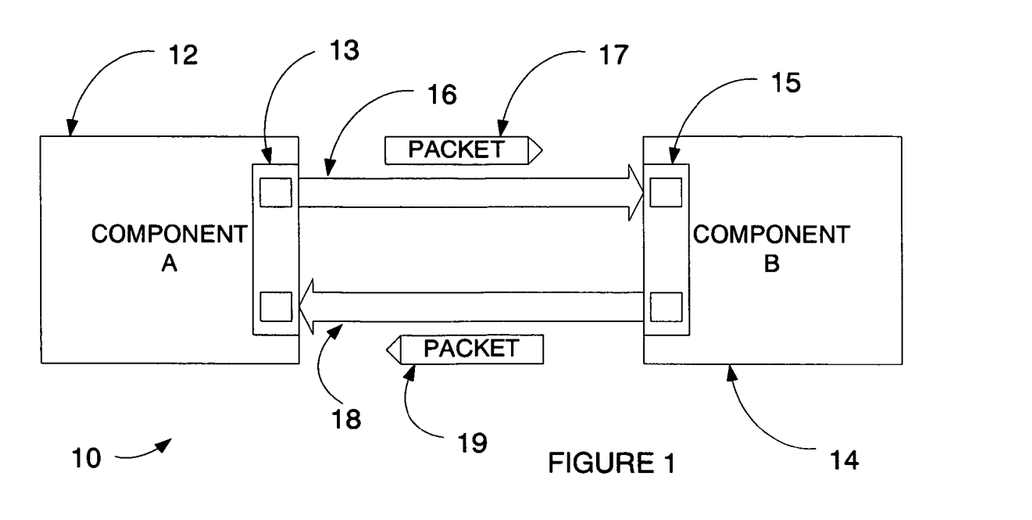
FIG. 1 shows a schematic representation of a PCI-Express connection.

With reference to FIG. 1, there will now be described the basic point-to-point communications channel provided by PCI-Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two unidirectional, low-voltage, differentially driven channels 16 and 18 connect the ports of the components, one channel in each direction. The channel pair can be referred to as a lane. The channels 16 and 18 carry packets 17 and 19 between the components. According to the PCI-Express 1.0 specification, each lane provides an effective data transfer rate of 2.5 Gigabits/second/lane/direction. For circumstances where this data bandwidth is insufficient, to scale bandwidth a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
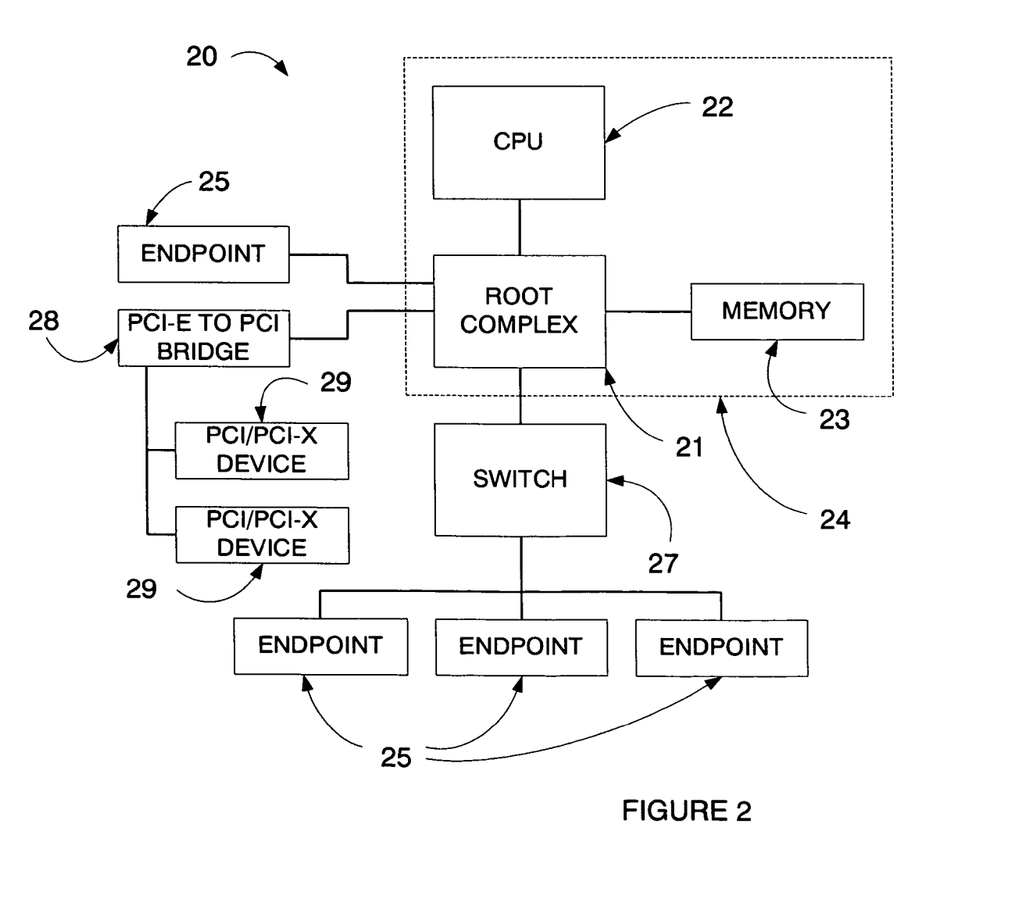
FIG. 2 shows a schematic representation of an example of a PCI-Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI-Express to PCI Bridge 28, all interconnected via PCI Express Links. The root complex 21 can be connected to a CPU 22 and memory 23 subsystem which requires access to the I/O facilitated by the PCI-Express Fabric. The combination or root complex, CPU and memory can be referred to as a host 24. The components of the topology are mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express Ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or Infiniband Host Channel Adapter (HCA).

Figure 3:
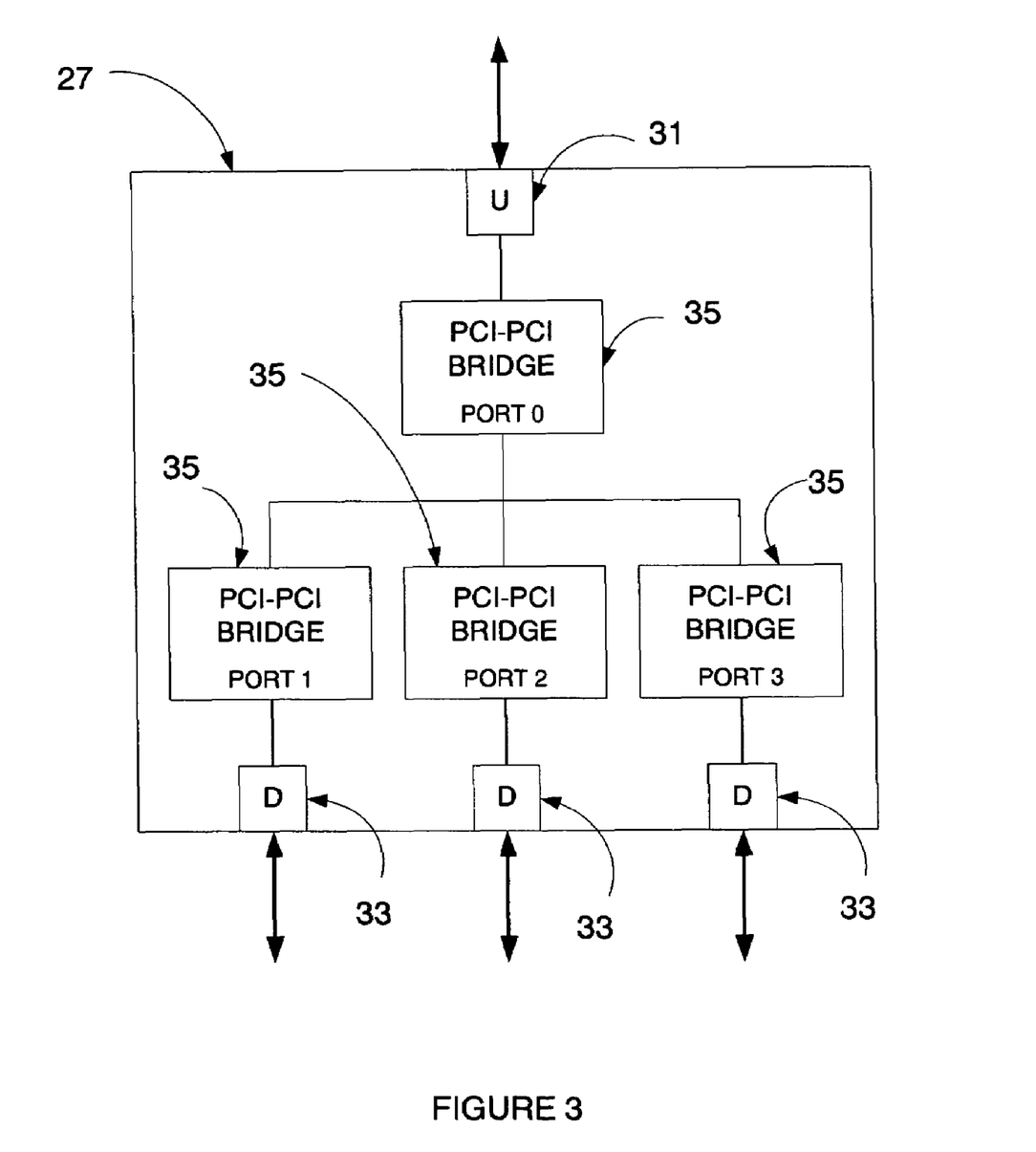
FIG. 3 shows a schematic representation of a PCI-Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express Bridges and forward transactions using PCI Bridge mechanisms; e.g., address based routing. Also, a switch is not allowed to split a packet into smaller packets, e.g., a single packet with a 256 byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

A PCI Express to PCI Bridge 28 provides a connection between a PCI Express fabric and a PCI/PCI-X hierarchy. Thereby, conventional PCI/PCI-X devices 29 may be connected to the PCI Express fabric and accessed by a host including a PCI-Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express Link is mapped through a virtual PCI-to-PCI Bridge structure and has a logical PCI bus associated with it. The virtual PCI-to-PCI Bridge structure may be part of a PCI Express Root Complex Port, a Switch Upstream Port, or a Switch Downstream Port. A Root Port is a virtual PCI-to-PCI Bridge structure that originates a PCI Express hierarchy domain from a PCI Express Root Complex. Logical devices are mapped into configuration space such that each will respond to a particular device number.

Figure 4:
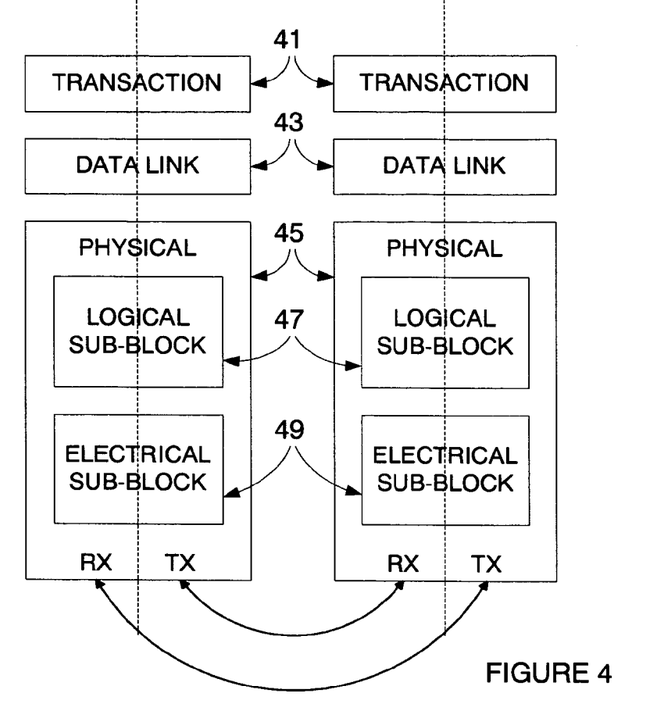
FIG. 4 shows a schematic overview of layering within PCI-Express.

A schematic overview of the PCI-Express architecture in layers is shown in FIG. 4. As shown, there are three discrete logical layers: the Transaction Layer 41, the Data Link Layer 43, and the Physical Layer 45. Each of these layers is divided into two sections: one that processes outbound (to be transmitted) information and one that processes inbound (received) information.

PCI Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device.

Figure 5:
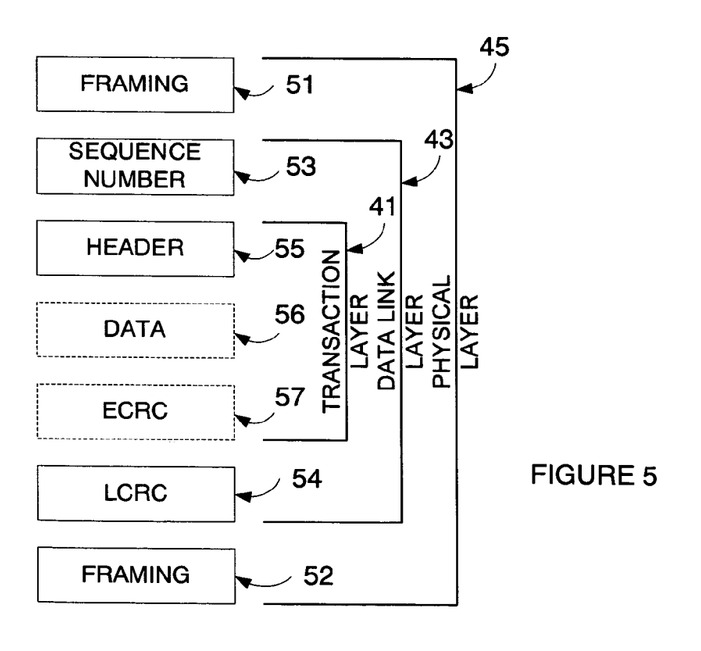
FIG. 5 shows a schematic representation of packet flow through the layers shown in FIG. 4.

A conceptual overview of the flow of transaction level packet information through the layers is shown in FIG. 5. Thus the Transaction Layer 41 provides a packet header 55, and can provide a data payload 56 and an ECRC (End-to-end Cyclic Redundancy Check) 57. The data link layer applies a sequence number 53 and a LCRC (Link Cyclic Redundancy Check) 54. The Physical Layer 45 then provides Framing 51, 52 for the packet. A simpler form of packet communication is supported between two Data Link Layers (connected to the same Link) for the purpose of Link management.

The upper Layer of the architecture is the Transaction Layer 41. The Transaction Layer's primary responsibility is the assembly and disassembly of Transaction Layer Packets (TLPs). TLPs are used to communicate transactions, such as read and write, as well as certain types of events. The Transaction Layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The Packets may also have attributes such as No Snoop and Relaxed Ordering.

The transaction Layer supports four address spaces: it includes the three PCI address spaces (memory, I/O, and configuration) and adds a Message Space. According to the PCI-Express specification, the Message Space is used to support all prior sideband signals, such as interrupts, power-management requests, and so on, as in-band Message transactions. PCI Express Message transactions can be considered "virtual wires" since their effect is to eliminate the wide array of sideband signals used in a conventional platform implementation.

The middle Layer in the stack, the Data Link Layer 43, serves as an intermediate stage between the Transaction Layer 41 and the Physical Layer 45. The primary responsibilities of the Data Link Layer 41 include Link management and data integrity, including error detection and error correction.

The transmission side of the Data Link Layer 43 accepts TLPs assembled by the Transaction Layer 41, calculates and applies a data protection code and TLP sequence number, and submits them to Physical Layer 45 for transmission across the Link. The receiving Data Link Layer 43 is responsible for checking the integrity of received TLPs and for submitting them to the Transaction Layer 41 for further processing. On detection of TLP error(s), the Data Link Layer is responsible for requesting retransmission of TLPs until information is correctly received, or the Link is determined to have failed.

The Data Link Layer 43 also generates and consumes packets that are used for Link management functions. To differentiate these packets from those used by the Transaction Layer (TLP), the term Data Link Layer Packet (DLLP) is used when referring to packets that are generated and consumed at the Data Link Layer.

The Physical Layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The Physical Layer 45 exchanges information with the Data Link Layer 43 in an implementation-specific format. The Physical Layer is responsible for converting information received from the Data Link Layer 43 into an appropriate serialized format and transmitting it across the PCI Express Link at a frequency and width compatible with the device connected to the other side of the Link.

The PCI Express architecture has various facilities to support future performance enhancements via speed upgrades and advanced encoding techniques. Depending on actual implementation of these enhancements, the future speeds, encoding techniques or media may only impact the Physical Layer definition.

The Transaction Layer 41, in the process of generating and receiving TLPs, exchanges Flow Control information with its complementary Transaction Layer 41 on the other side of the Link. It is also responsible for supporting both software and hardware-initiated power management.

Initialization and configuration functions require the Transaction Layer 41 to store Link configuration information generated by the processor or management device and store Link capabilities generated by Physical Layer hardware negotiation of width and operational frequency A Transaction Layer's Packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the Transaction Layer 41 tracks flow control credits for TLPs across the Link. Transaction credit status is periodically transmitted to the remote Transaction Layer using transport services of the Data Link Layer. Remote Flow Control information is used to throttle TLP transmission.

The Transaction Layer 41 can also implement ordering rules including the PCI/PCI-X compliant producer consumer ordering model and extensions to support relaxed ordering.

Power management services within the Transaction Layer 41 may include: ACPI/PCI power management, as dictated by system software; and hardware-controlled autonomous power management minimizes power during full-on power states.

The Transaction Layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide a means to support multiple independent logical data flows over given common physical resources of the Link. Conceptually, this involves multiplexing different data flows onto a single physical Link. The Traffic Class is a Transaction Layer Packet label that is transmitted unmodified end-to-end through the fabric. At every service point (e.g., Switch) within the fabric, Traffic Class labels are used to apply appropriate servicing policies. Each Traffic Class label defines a unique ordering domain— no ordering guarantees are provided for packets that contain different Traffic Class labels.

The Data Link Layer 43 is responsible for reliably exchanging information with its counterpart on the opposite side of the Link. Accordingly, it has responsibility for initialization and power management services to: accept power state requests from the Transaction Layer 41 and convey them to the Physical Layer 45; and to convey active/reset/disconnected/power managed state information to the Transaction Layer 41.

The Data Link Layer 43 also provides data protection, error checking, and retry services including: CRC generation; transmitted TLP storage for data link level retry; error checking; TLP acknowledgment and retry messages; and error indication for error reporting and logging.

The Physical Layer 45 provides services relating to interface initialization, maintenance control and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >×1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the Link; and Link status information.

The data link to physical interface provides: byte or multi-byte wide data to be sent across the link (including a data transfer handshake mechanism, and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI-Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

Figure 6:
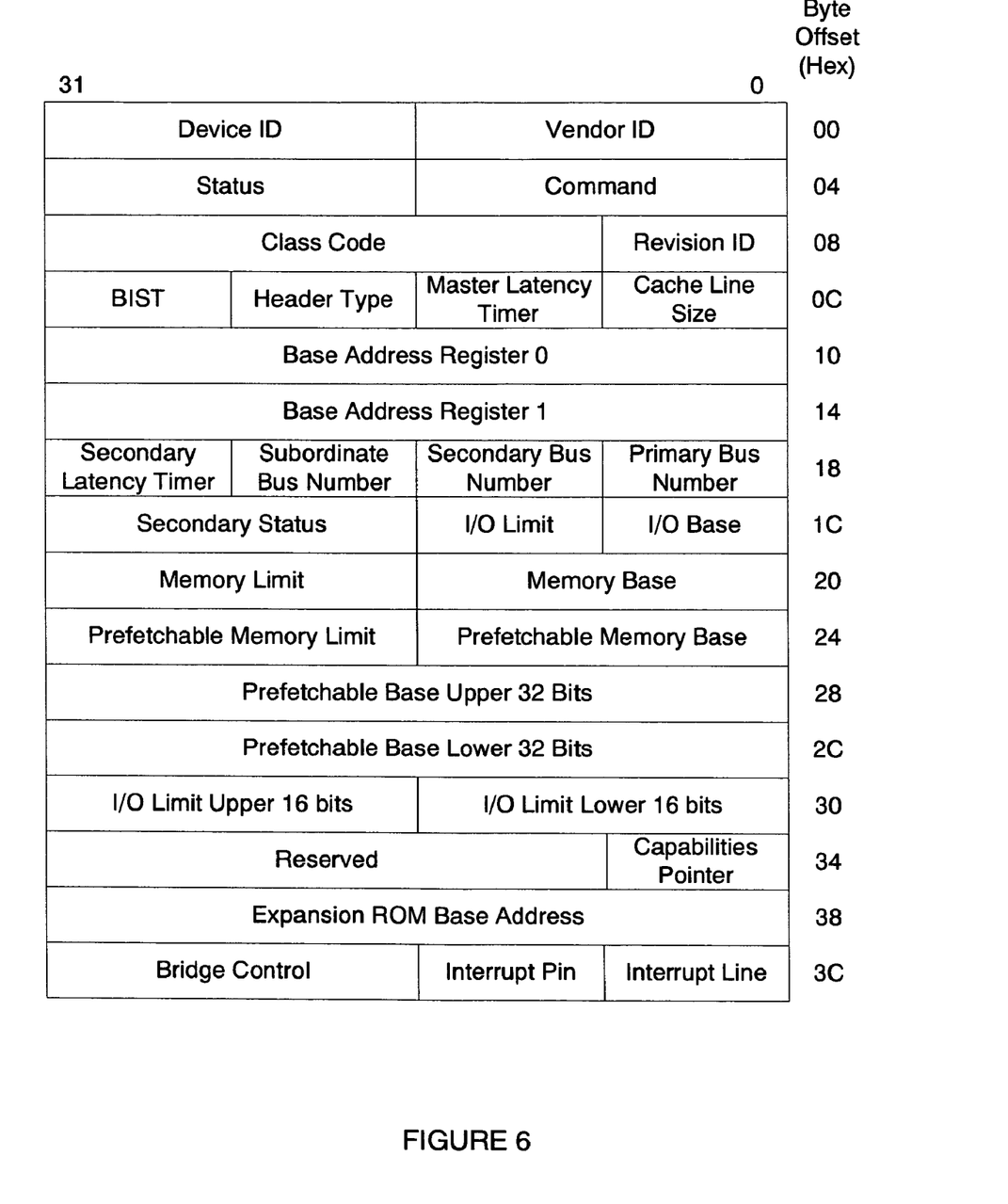
FIG. 6 shows a schematic structure overview for a type 1 configuration header.
Figure 7:
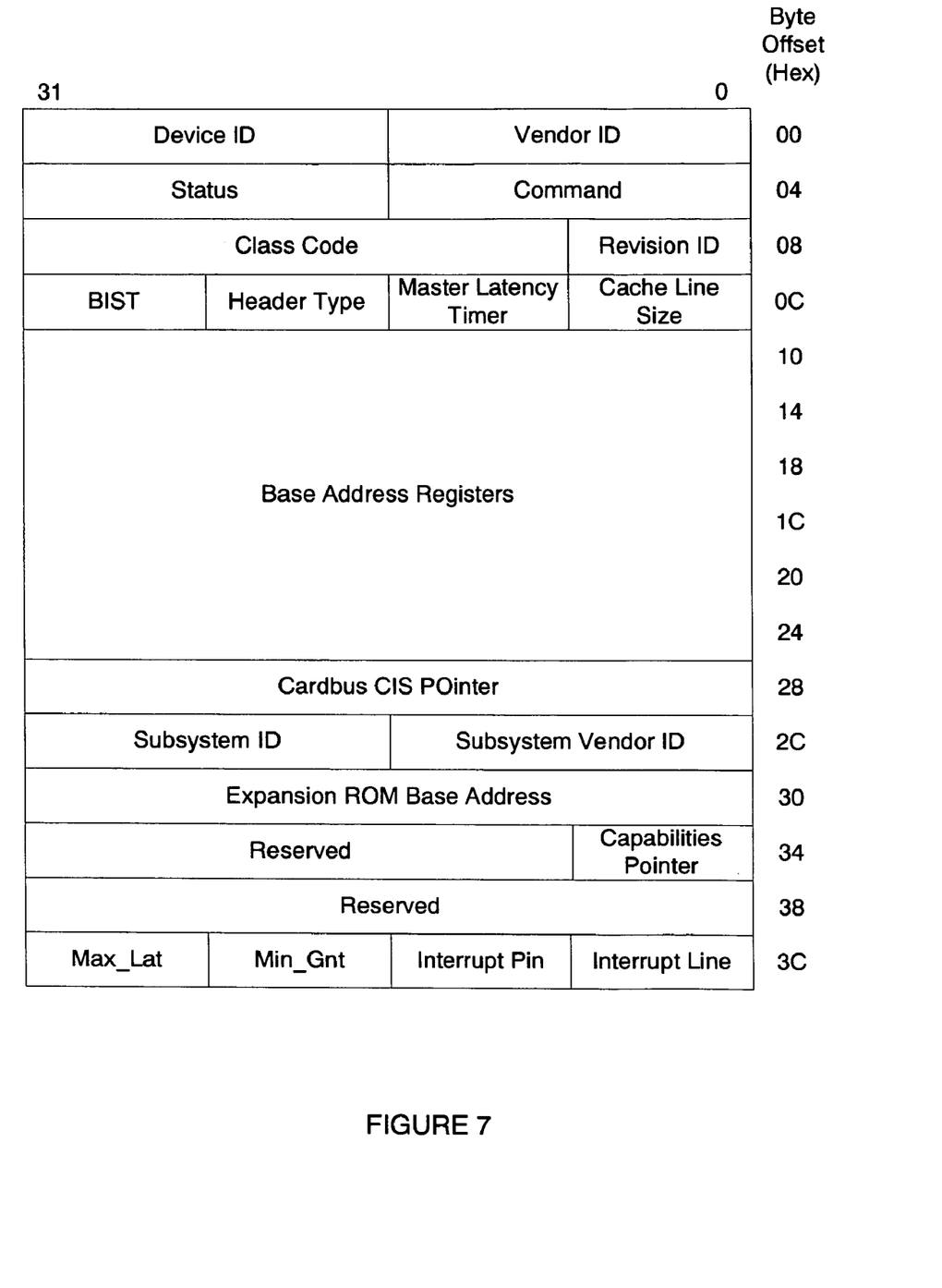
FIG. 7 shows a schematic structure overview for a type 0 configuration header.

As described above, a PCI Express switch provides a single upstream port and one or more downstream ports. Configuration of the ports can be carried out using the PCI Express Configuration Space Headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P). Each P2P bridge is identified through the Class Code register in the Type 1 header being equal to a P2P (0x060400). Note that in accordance with the PCI Express specification, a PCI Express endpoint control and status register description is defined as a type 0 and a P2P control and status register is defined as a type 1. The class code is part of the control and status register in the type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (bus device function number). Each transaction layer packet which is transferred over the fabric includes a RequesterID field which is equal to the BDF of the requester of a transaction. In some cases, the packet may also include a CompleterID, which is the BDF of the completer of the transaction. The Type 0/1 headers are transmitted as payload to a transaction layer packet request. The BDF is a 16-bit field composed of a Bus Number (8-bit, BN), a Device Number (5-bit, DN) and a Function Number (3-bit, FN). After the bus-walk is complete, the system platform performs bus enumeration by conducting a series of configuration write requests which include values which reflect the type 0/1 headers within the payload to each device in the PCI Express hierarchy. This process assigns each device with a unique Bus Number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the Configuration Request used by the root complex to enumerate the bus contains a type 1 header in its payload field. An example of the PCI Express Type 1 configuration space header is shown in FIG. 6. As can be seen from the Figure, the type 1 header includes fields identifying the device (Device ID, which is a physical device identifier, and Vendor ID, which is an identifier of the vendor company of the device). The type 1 header also includes fields describing the status of the device (Status and Command, which is the Command and Status Register which provides status and control over the PCI Express interface. The Class Code field is used to define the type of device, as indicated above the P2P bridge is identified by a class code of 0x060400. The Type 1 header also has fields to identify the primary and secondary bus numbers of the P2P. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of {BN=virtual PCI Bus (2 in FIG. 3), DN=actual port/device, FN=0}.

Also, respective ports may have respective secondary bus numbers, e.g. PORT 1 may have secondary bus number 3 (00000011), PORT 2 may have secondary bus number 4 (00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that figure, many of the fields are common to both Type 0 and Type 1 headers.

Of the fields in the Type 0 header which are not used in the Type 1 header, the $Min_{13}Gnt$ and $Max_{13}Lat$ headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the PAR of PORT 3 may have a base of x0400 and a limit of x04FF. Thus the BAR of PORT 0 must a have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

With reference to FIGS. 6 to 11, there will now be described examples of a PCI Express switch operable to provide soft device allocation between connected hosts. In some examples, the switch can be operable to be fully compatible with the existing PCI device programming model as seen from the device driver. In some examples, the fabric definition to support a multi-host shared device can be an extension of the existing PCI Express switch model. In some examples, the fabric definition to support a multi-host shared device can be backwards compliant to legacy devices and legacy switches at its endpoints. In some examples, the interoperability of a virtualized switch with designs based on the existing PCI Express packet format and wire protocols can be maximized. In some examples, the existing I/O software framework can be used unmodified with a virtualized switch and a multi-host shared device.

Figure 8:
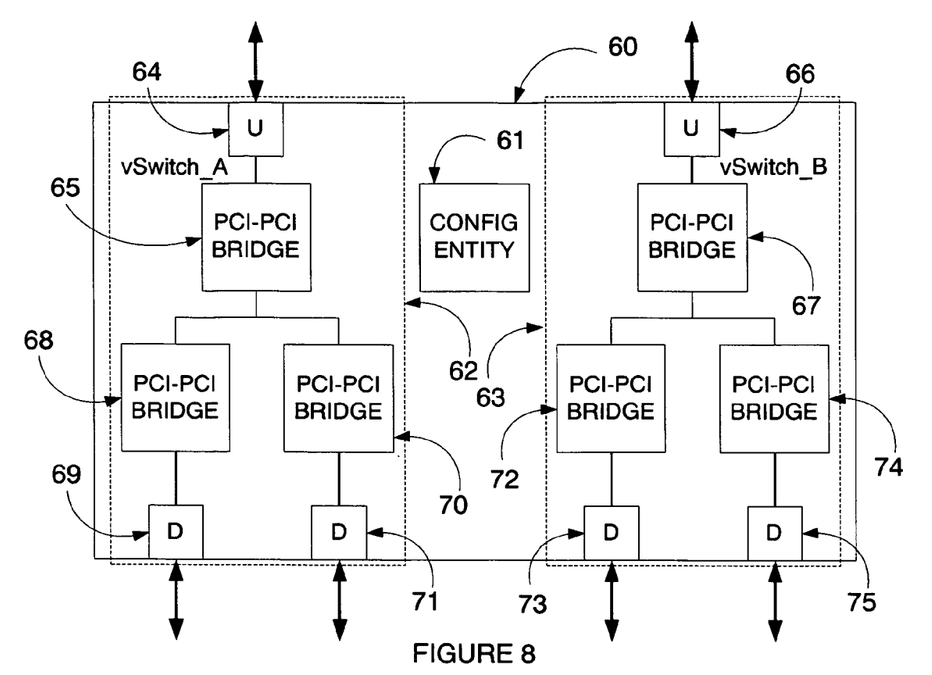
FIG. 8 shows a schematic representation an example of a PCI-Express switch.

A first example of a virtualized switch is shown in FIG. 8. FIG. 8 shows a schematic example of a PCI Express switch 60 with two ports configured as upstream ports and four ports configured as downstream ports. In the present examples, any port can be soft-configured as either of an upstream or downstream port. The switch can be configured by a configuration entity into two independent switches which can be considered as virtual switches (vSwitch) 62, 63. A vSwitch 62, 63 of the present example consists of a single upstream port 64, 65 and 66, 67 that provides connection upstream towards the root complex of the PCI-E device hierarchy, and one or more downstream ports 68, 69; 70, 71; 72, 73; and 74, 75. The upstream ports may be connected to different hosts or to different ports of the same host. The configuration entity 61 allocates downstream ports to a vSwitch based on out-of-band policy information. Each vSwitch behaves as a separate PCI Switch. In the present example, the switch in FIG. 8 is partitioned into two independent virtual switches, vSwitch_A 62 and vSwitch_B 63, each having two downstream ports.

The partitioning mechanism in the configuration entity 61 controls the ports such that the platform initialization software in each connected host (or host port) only has access to the downstream port(s) allocated to the respective upstream port.

Thus a virtualized switch including multiple virtual switches within a single physical switch has now been described. With continued reference to FIG. 8, and with reference to FIGS. 9 and 10, further functionality of the switch of the present example will now be described.

According to the present example, a given vSwitch configuration can be dynamically changed by management software through the configuration entity. This can be achieved by migrating one or more downstream ports from one vSwitch to another. The policy for initiating this migration is, in the present example, typically determined by a higher-level management entity that may communicate with the configuration entity through an out-of-band mechanism. The migration mechanism used by the configuration entity of the present example is based on PCI Express hot-plug interrupt events as defined in the PCI Express standard.

Figure 9:
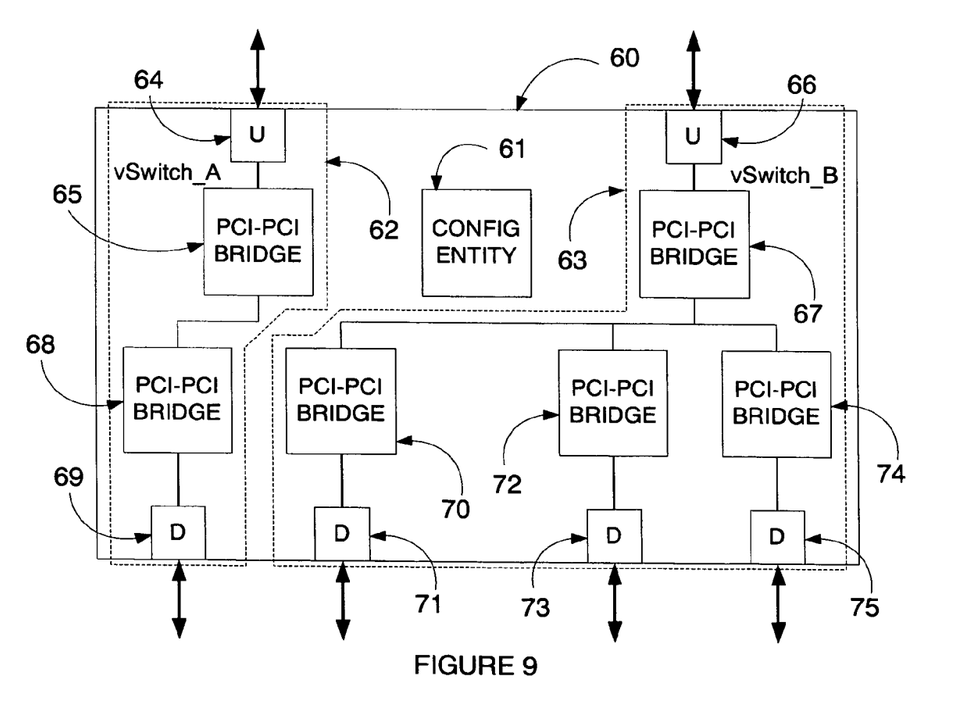
FIG. 9 shows a schematic representation of the switch of FIG. 6 in an alternative operational configuration.
Figure 10:
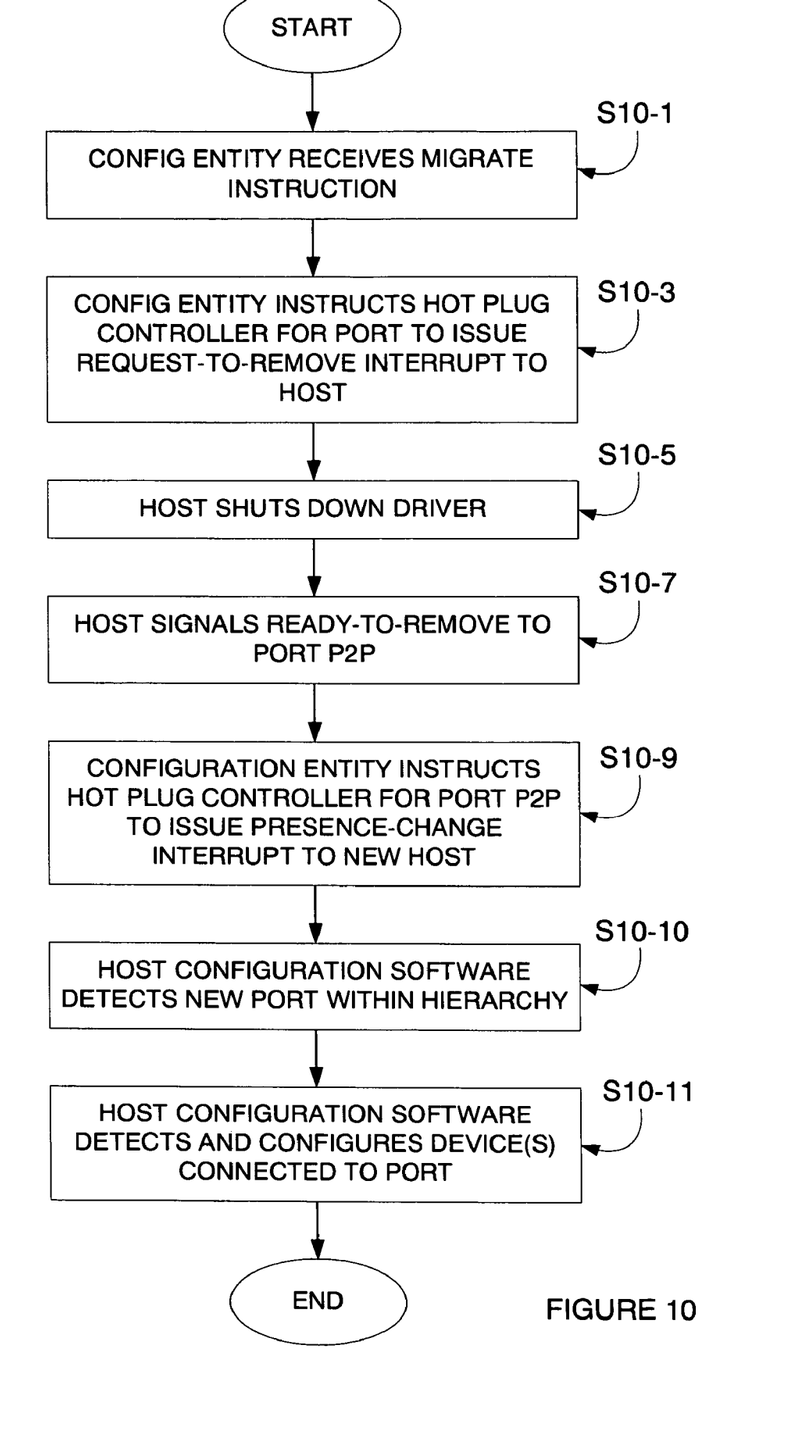
FIG. 10 is a flow chart setting out steps in a process to alter an operational configuration of the switch of FIG. 6.

An example of the migration procedure for the switch of the present example will now be described with reference to FIG. 10. This example describes the migration of the ownership of a downstream port from the upstream port at vSwitch_A 62 to the upstream port at vSwitch_B 63. First, at step S10-1, the configuration entity 61 receives an instruction that a given downstream port (70, 71) is to be migrated. Next, at step S10-3, the configuration entity 61 instructs the hot-plug controller that is within the downstream port that is to be migrated to issue a 'request-to-remove' interrupt to the host to which vSwitch_A 62 is connected. The system software on that host agrees to the request and shuts down the device driver(s) for the device(s) attached to the downstream port 70, 71 at step S10-5. Then, at step S10-7, the host signals ready-to-remove to the downstream port P2P 70. The configuration entity detects this event, and at step S10-9 instructs the hot-plug controller of downstream port P2P 70 to issue a 'presence change' interrupt event that goes to the host attached to the upstream port 66, 67 on vSwitch B 63. This step may include forcing a reset of the hierarchy below the downstream port. System software on that host detects at step S10-10 that a new downstream port has been attached to the device hierarchy. Next, at step S10-11, the software on the host detects and configures the device(s) attached to the migrated port 70, 71. This detection and configuration includes assigning bus numbers and BARs to the downstream port P2P 70 and attached downstream device(s). The new configuration is illustrated in FIG. 9.

In the method of this example, it may be necessary to renegotiate bus numbers and/or BARs for all devices connected to the hierarchy of the host to which the port is migrated to avoid conflicts with already defined bus numbers and/or BARs in the pre-migration configuration of the hierarchy including vSwitch_B.

Thus there has now been described an example of an apparatus and method for division of a single physical PCI Express switch into a plurality of virtual PCI Express switches, each of which connects through a separate upstream port to a host. There has also been described a method and apparatus for migration of a downstream port between virtual switches within physical PCI Express switch.

Figure 11:
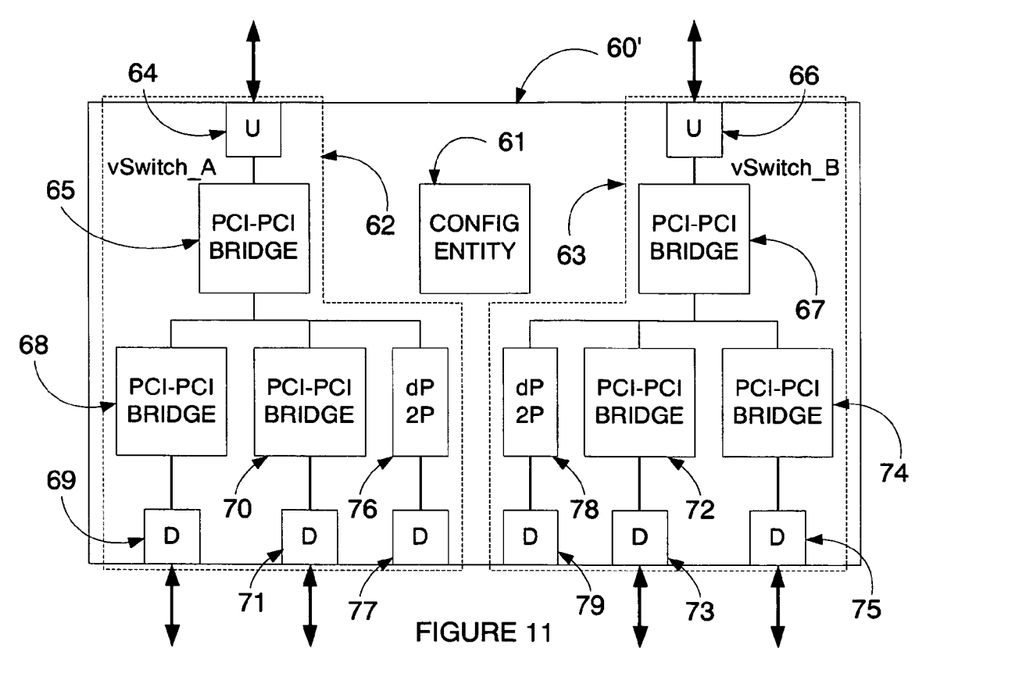
FIG. 11 shows a schematic representation an example of a PCI-Express switch.
Figure 12:
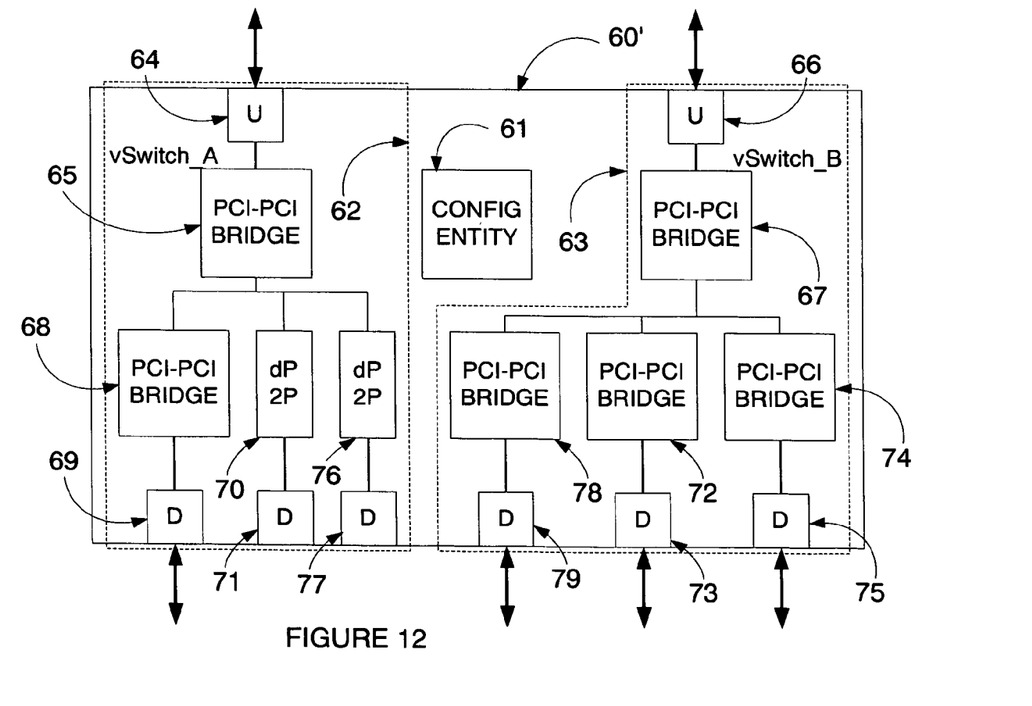
FIG. 12 shows a schematic representation of the switch of FIG. 9 in an alternative operational configuration.
Figure 13:
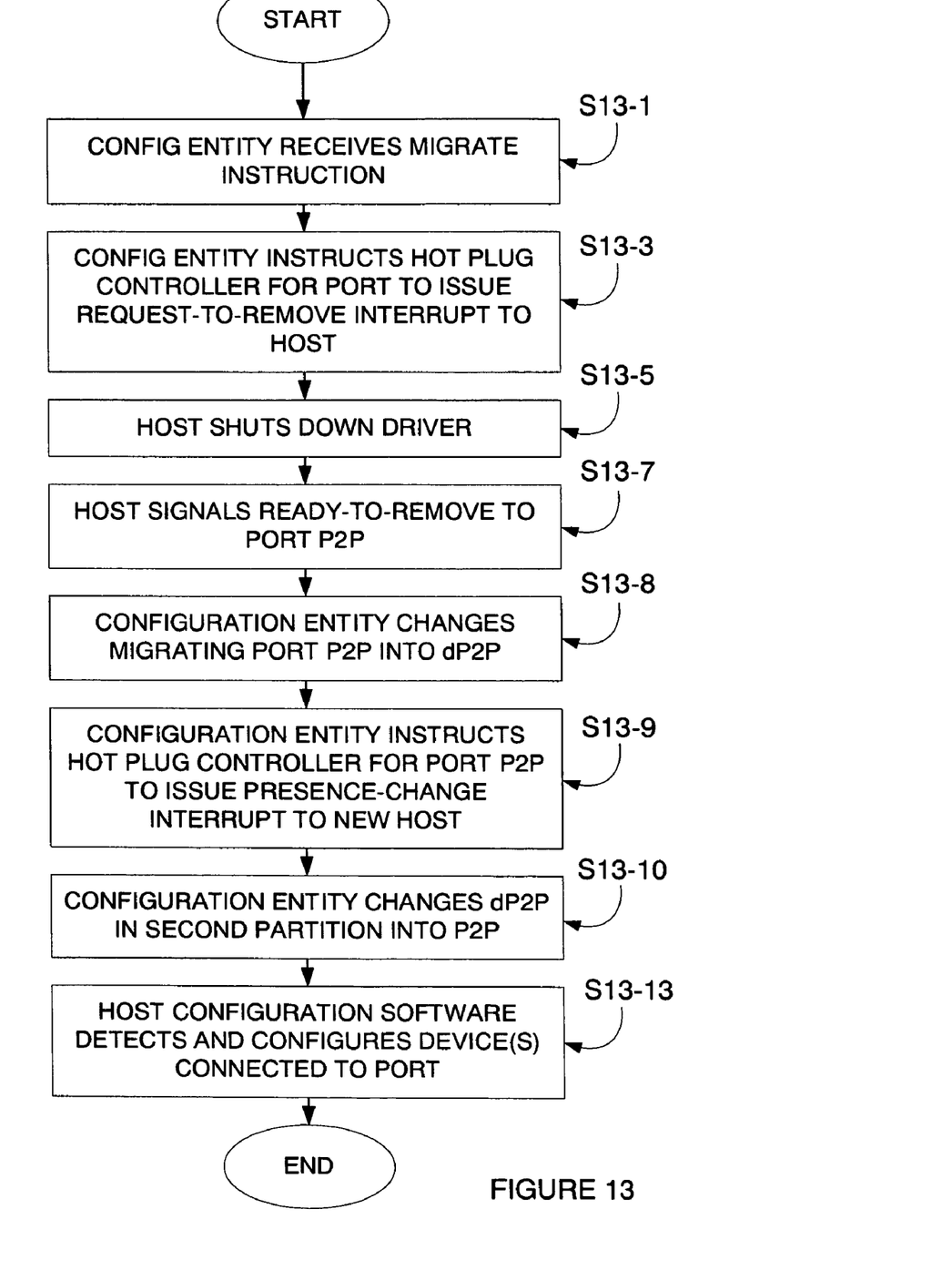
FIG. 13 is a flow chart setting out steps in a process to alter an operational configuration of the switch of FIG. 9.

With reference to FIGS. 11 to 13, a second example of a virtualized PCI Express switch will be described. For ease of reference, elements corresponding to those described with reference to FIGS. 8 and 9 above have like reference numerals in FIGS. 11 and 12. In order to avoid obscuring the particular features of the present example, a full description of these elements previously described will not be repeated in all cases.

FIG. 11 shows a PCI Express switch 60' having a configuration entity 61, two ports configured as upstream ports 64, 65 and 66, 67, and four ports configured as downstream ports 68, 69; 70, 71; 72, 73; and 74, 75. The upstream and downstream ports are divided into two virtual switches vSwitch_A 62 and vSwitch_B 63 as previously described. As previously noted, in the present examples any port can be soft-configured as either an upstream or downstream port. Additionally, the switch 60' of the present example has two virtual P2Ps (i.e. virtual PCI Express to PCI Express bridges, which for ease of reference will henceforth be referred to as dummy virtual PCI Express to PCI Express bridges (dP2Ps)) 76, 77 and 78, 79. In the example configuration shown in FIG. 9, each of vSwitch_A 62 and vSwitch_B 63 includes a respective dP2P 76, 77; 78, 79.

At the time of initial setup and configuration of the PCI hierarchy attached to each upstream port, each dP2P is identified during bus-walk and configured accordingly, but there is no physical link attached to it. Accordingly, each hierarchy includes a bus number and BAR allocation for each dP2P included in the hierarchy. This is, effectively, a spare bus number and BAR allocation within that hierarchy.

In the present example, during port migration a port that is to be migrated from one vSwitch to another (from vSwitch_A to vSwitch_B in the present example) is transformed from a P2P into a dP2P at the first vSwitch and the "new" port at the second vSwitch is transformed from a dP2P to a P2P.

As will now be described with reference to FIG. 13, this migration method is similar to that described with reference to FIG. 98 above, but with alterations to take account of the dP2P. In the present example, port 70, 71 of vSwitch_A 62 is to be migrated to vSwitch_B 63. Thus the configuration entity receives a migrate instruction at step S13-1. The configuration entity then instructs the hot-plug controller for the port to be migrated to issue a "request-to-remove" interrupt to the host of that virtual switch at step S13-3. The host then shuts down the driver for any attached devices at step S13-5, and signals "ready-to-remove" to the port P2P at step S13-7. Then, when the configuration entity detects the 'ready-to-remove' event from the host at the downstream port to be migrated in vSwitch A, the configuration entity transforms this downstream P2P in vSwitch A into a dP2P at step S13-8. The configuration entity then, at step S13-9, instructs the hot-plug controller of downstream port dP2P 78 to issue a 'presence change' interrupt event that goes to the host attached to the upstream port 66, 67 on vSwitch B 63. At step S13-10 the configuration entity then reconfigures the dP2P 78 as a P2P, effectively moving the physical link which was seen by the host for vSwitch_A as port 70, 71 to be visible to the host for vSwitch_B as port 78, 79. The host software on the host for vSwitch_B 63 then detects the "new" devices within its hierarchy at step S13-13. The host of vSwitch_B does not need to detect and set up the port, as it set up the port as a dP2P during initial system setup and configuration. Thus there is no requirement in the present example to renegotiate the hierarchy bus numbers and BARs from the root complex to the downstream port when a port is migrated. However, the bus numbers and BAR assignments for the downstream hierarchy of the downstream port may need to be renegotiated.

The skilled reader will appreciate that as each P2P is a virtual bridge, the actual PCI Link from the downstream port is not physically moved from one hardware connection to another. Rather the physical port remains connected to the physical link, and the virtual bridges are reconfigured such that the physical port is migrated from one switch partition (virtual switch) to the other.

If a switch is configured to have as many dP2Ps for each vSwitch or partition as that switch has physical downstream ports, then the physical ports can be migrated between the various vSwitches in any combination without the PCI Express hierarchy of which those vSwitches are members to need to be renegotiated following migration.

Thus there has now been described an example of an apparatus and method for division of a single physical PCI Express switch into a plurality of virtual PCI Express switches, each of which connects through a separate upstream port to a host. There has also been described an example of a method and apparatus for migration of a downstream port between virtual switches within physical PCI Express switch in a manner which minimizes management overhead and interruption to other devices connected in the same hierarchies as the migrated port.

In some examples, the provision for migration of downstream ports between upstream ports allows for redundancy to be provided in a PCI Express based system. By connecting two or more upstream ports of a PCI Express switch to different ports of a host, a link failover facility can be provided to allow the host to access all devices connected to the switch to be accessed even if the link between one of the upstream ports and the host fails.

Figure 14:
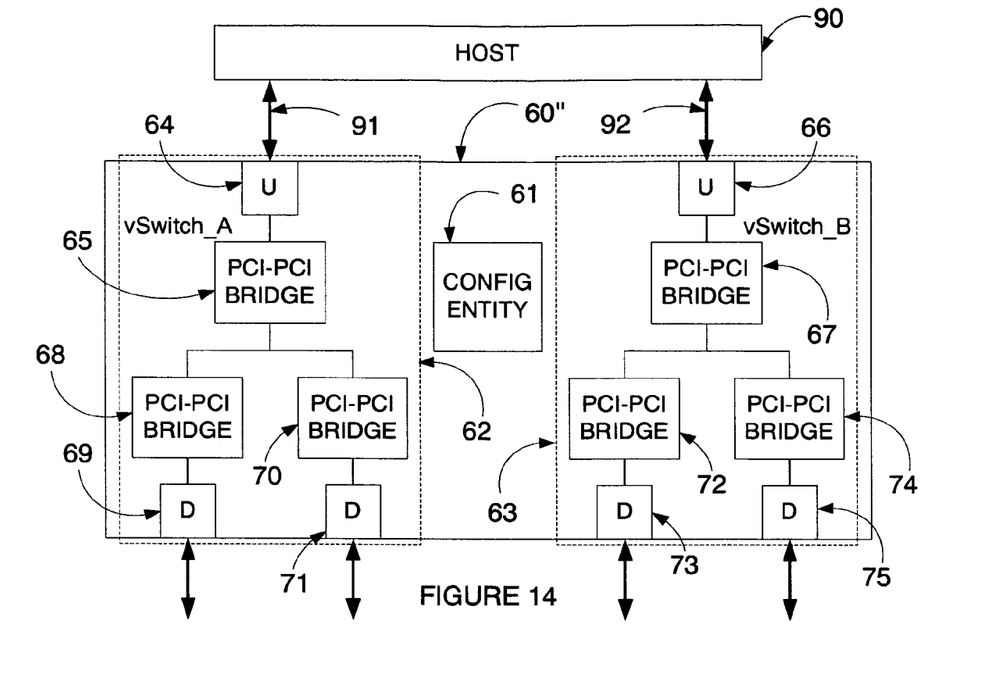
FIG. 14 shows a schematic representation an example of a PCI-Express switch.

As shown in FIG. 14, a PCI switch 60" may have two virtual switches vSwitch_A 62 and vSwitch_B 63. In a default configuration, each of vSwitch_A 62 and vSwitch_B 63 may include one port configured as an upstream and two ports configured as downstream ports each. As previously noted, in the present examples, any port can be soft-configured as either an upstream or downstream port. Each of vSwitch_A 62 and vSwitch_B 63 connect to a host 90 via respective links 91 and 92. Links 91 and 92 may be direct links as illustrated or may be via other devices such as further switches. At least a part of link 91 is physically distinct from link 92, such that an element of physical redundancy in the link paths is provided.

If link 91 fails, then link failover can be performed. The failure in link 91 is such that the operation of link 92 is unaffected. Thus if links 91 and 92 have any common elements, then the failure in link 91 must be in a part which does not stop the operation of link 92 in order to for link failover to be performed. In many examples, links 91 and 92 may be totally distinct in order to provide maximum redundancy and protection against failure. The failure can be any one or a combination of a failure in the upstream port in the switch, the actual link or the port within the host.

Figure 15:
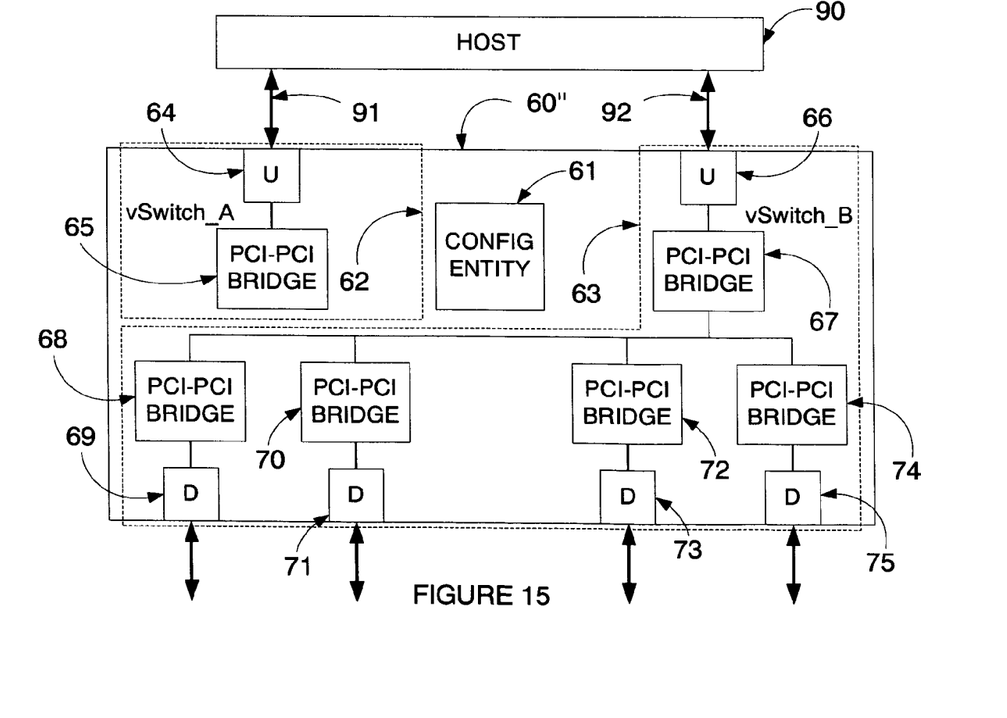
FIG. 15 shows a schematic representation of the switch of FIG. 12 in an alternative operational configuration following a link failover operation.

In the event of link 91 failing, failure detection by a management entity can be used to trigger link failover. The management entity for detecting the link failure may be a management entity within the host (implemented in hardware, firmware, software or a combination thereof) or by the configuration entity 61 of the switch 60". Following the detection, a port migration operation can be performed for all downstream ports in vSwitch_A 62 to move them to vSwitch_B 63 such that the ports are reconfigured as shown in FIG. 15.

Although this example has been shown in the context of the switch structure shown in FIGS. 8 and 9, it will be appreciated that the same link failover migration can be performed using a switch making use of dP2Ps as shown in FIGS. 11 and 12.

Alternative link failover strategies can include the upstream ports of a switch being connected to different hosts, and those different hosts being operable to provide access to connected PCI Devices by some means remote from the PCI Express fabric in which the switch resides. For example the hosts may be different processing engines within a clustered computing arrangement.

The method of the present examples can be scaled to any extent possible within the maximum device limits of the PCI Express specification. In the general case, a PCI Switch has N upstream ports and M downstream ports. The switch can be split into N vSwitches, and if it is desired that each vSwitch can be configured to include at least one downstream port at any given time, then the number N of upstream ports should be less than the number M of downstream ports. The downstream ports within the switch may be migrated between vSwitches such that at any given time, a given vSwitch can be configured to include between zero and M downstream ports.

Although it has been described in the above examples that the configuration entity is a part of the switch, the configuration entity can be placed in different locations and provide the same functions. For example, the configuration entity can be provided elsewhere within the fabric, such as within another switch in the fabric or within a root complex at a host. Alternatively, a dedicated configuration host can be provided.

Accordingly, there have now been described various examples of methods and apparatus which can be dynamically configured to alter the composition of a PCI Express fabric in dependence upon requirements determined by a management entity. Thus, shared (multi-host) access can be provided to a single PCI Express fabric. Also, shared (multi-host) access can be provided to a PCI Express device connected to a single PCI Express fabric. Additionally, failover can be provided.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A switch configured to support PCI Express, comprising:
   a first port operable to be connected to a first root complex;
   a second port operable to be connected to a second root complex;
   a third port operable to be connected to an I/O device and having a first data connectivity path to said first port;
   a fourth port operable not to be connected to an I/O device or host, and having a second data connectivity path to said second port;
   a processing unit operable to manage device and memory allocation between virtual ports; and
   a migration controller operable to cause said first data connectivity path to be closed and to cause a further data connectivity path to be established between said third port and said second port.

2. The switch of claim 1, wherein said first and second ports are upstream ports.

3. The switch of claim 1, wherein said third port is a downstream port.

4. The switch of claim 1, wherein said migration controller is operable to send a disconnect request message to said first root complex to cause said data connectivity path to be closed.

5. The switch of claim 1, wherein said migration controller is operable to send a connection request message to said second root complex to cause said further data connectivity path to be established.

6. The switch of claim 1, wherein said migration controller is operable to cause said further connectivity path to be established by redirecting the data connectivity path between the second port and the fourth port to the third port.

7. The switch of claim 1, wherein said first root complex and said second root complex are associated with a single host.

8. A connectivity fabric comprising:
a first root complex;
a second root complex;
an endpoint; and
a switch comprising:
  a first port operable to be connected to said first root complex;
  a second port operable to be connected to said second root complex;
  a third port operable to be connected to said endpoint and having a first data connectivity path to said first port;
  a virtual port operable not to be connected to a root complex device or endpoint and having a second data connectivity path to said second port;
  a processing unit operable to manage device and memory allocation between virtual ports; and
  a migration controller operable to cause said first data connectivity path to be closed and to cause a further data connectivity path to be established between said third port and said second port.

9. The fabric of claim 8, wherein said first root complex and said second root complex are associated with a single host.

10. The fabric of claim 8, wherein said migration controller is operable to cause said further connectivity path to be established by redirecting the data connectivity path between said second port and said virtual port a to said third port.

11. A method of migrating an I/O device between a first host and a second host, wherein said hosts are inter-connectable to said I/O device via a switch that is operable to support PCI Express and comprises a first port connected to said first host; a second port connected to said second host, a third port connected to said I/O device and having a first data connectivity path to said first port, and a fourth port not connected to an I/O device or host and having a second data connectivity path to said second port, the method comprising:

causing said first data connectivity path to be closed and to cause a further data connectivity path to be established between said third port and said second port, whereby a connection between said first host and said I/O device is caused to be terminated, and a connection between said I/O device and said second host is caused to be initiated, wherein said causing a connection between said I/O device and said second host to be initiated comprises redirecting a connection between said second host and a dummy I/O device to said I/O device.

12. The method of claim 11, wherein said causing a connection between said first host and said I/O device to be terminated comprises sending a disconnect request to said first host.

13. The method of claim 12, further comprising sending said disconnect request from a configuration entity operable to control connections between said hosts and said I/O device.

14. The method of claim 11, wherein said causing a connection between said I/O device and a second host to be initiated comprises sending a connect request to said second host.

15. The method of claim 14, further comprising sending said connect request from a configuration entity operable to control connections between said hosts and said I/O device.

16. The method of claim 11, wherein said hosts are PCI Express hosts, and wherein said I/O device is a PCI Express device.

* * * * *